United States Patent [19]
Rao et al.

[11] Patent Number: 6,070,182
[45] Date of Patent: May 30, 2000

[54] DATA PROCESSOR HAVING INTEGRATED BOOLEAN AND ADDER LOGIC FOR ACCELERATING STORAGE AND NETWORKING APPLICATIONS

[75] Inventors: Ravi S. Rao; Byron R. Gillespie, both of Phoenix; Elliot Garbus; Joseph Murray, both of Scottsdale, all of Ariz.

[73] Assignee: Intel Corporation, Santa Clara, Calif.

[21] Appl. No.: 09/092,275

[22] Filed: Jun. 5, 1998

[51] Int. Cl.[7] ....................................................... G06F 7/50
[52] U.S. Cl. .............................................................. 708/708
[58] Field of Search ................................... 708/231, 230, 708/490, 700, 708, 707; 712/34, 33; 758/707, 708

[56] References Cited

U.S. PATENT DOCUMENTS

| | | | |
|---|---|---|---|
| 4,701,876 | 10/1987 | McCanny et al. | 364/728 |
| 5,025,408 | 6/1991 | Sherman | 364/759 |
| 5,235,537 | 8/1993 | McWhirter et al. | 364/736 |
| 5,465,224 | 11/1995 | Guttag et al. | 364/716 |
| 5,745,125 | 4/1998 | Deering et al. | 345/503 |

*Primary Examiner*—John A. Follansbee
*Attorney, Agent, or Firm*—Blakely, Sokoloff, Taylor & Zafman LLP

[57] ABSTRACT

An application accelerator unit (AAU) that is integrated as part of a data processor, such as an I/O processor (IOP) integrated circuit. In one embodiment, the AAU includes logic for improving the performance of storage applications such as Redundant Array of Inexpensive Disks (RAID). The AAU performs boolean operations such as exclusive-or (XOR) on multiple blocks of data to form the image parity block which is then written to the redundant disk array. Additionally, the AAU may feature adder logic configured to perform an addition such as a network header checksum calculation on each data packet. The AAU includes a memory-mapped programming interface that allows software executed by a core processor in the IOP to utilize the AAU for accelerating storage and networking applications as well as for local memory DMA-type transfers, using the chain descriptor construct.

16 Claims, 6 Drawing Sheets

DATA PROCESSOR HAVING INTEGRATED BOOLEAN AND ADDER LOGIC FOR ACCELERATING STORAGE AND NETWORKING APPLICATIONS

BACKGROUND INFORMATION

1. Related Application

This invention is related to U.S. patent application entitled, *"Boolean and Data Movement Accelerator,"* filed concurrently herewith.

2. Field of the Invention

This invention is related generally to computer systems and more particularly to I/O subsystem architectures.

3. Description of Related Art

To extend overall computer system performance, designers have sought to improve input/output (I/O) performance to keep pace with the ever increasing processing speed of modern and future host processors. The development of computers with intelligent I/O subsystems is one such improvement that is believed to help eliminate the I/O bottleneck. Such a computer is divided into a local bus, a primary bus, and a secondary bus, where the I/O devices normally reside on the secondary bus, the host system resides on the primary bus, and a subsystem processor is coupled to the local bus. The primary and secondary buses are coupled by a bridge. Redirecting interrupt-intensive I/O tasks to the subsystem processor and away from the host processor frees host resources such as host memory and the primary bus. This allows the development of I/O capability independently of the host system. The I/O subsystem may be one which complies with the industry-standard Intelligent I/O ($I_2O$®) interface for Peripheral Components Interconnect (PCI) bus applications.

The I/O subsystem typically includes a single integrated circuit die known as an I/O processor (IOP). The salient functions traditionally integrated on the single chip I/O processor include part of the local bus, a core (subsystem) processor, a memory controller, the bridge, and address translation units that are coupled between the local bus and the primary and secondary buses. Some applications of the I/O processor are described below as two currently popular system applications: storage and networking.

Storage Applications

The I/O processor can be used in a computer system that implements reliable data storage. One such application is the implementation of a Redundant Array of Inexpensive Disks (RAID). The computer system in a RAID application features a disk controller as an intelligent agent on the secondary portion of a PCI system bus. The disk controller couples a number of disk storage devices that form the redundant array.

A RAID application running what is conventionally known as the "RAID algorithm" typically involves the compute-intensive, as well as bus-intensive, task of updating parity information associated with a series of data blocks that are stored in the redundant array each time a new block of data is written to the series. The host processor issues a request to store new data. The I/O processor responds by accepting the request and transferring the new data from host memory to local memory. The core processor partitions the new data into smaller blocks, then performs a bitwise exclusive-or (XOR) operation between these new blocks and possibly another block from the series, the other block having been fetched from the redundant array. The results of that operation may then be XORed with yet another block from the series. These XOR operations continue in this way until all targeted blocks in the series have been XORed resulting in an updated parity block for the series. The updated parity block and the new data block, are then transferred to the redundant array.

The above scenario depicts an implementation of the RAID application where the core processor shoulders the task of fetching each block of the series and performing successive XOR operations. Although this software solution is flexible, this approach takes longer to compute the parity block, and therefore becomes less desirable, as the block size is increased. Therefore, it would be desirable to have a computer system design that performs the RAID application more efficiently and expediently with larger block sizes.

Networking Applications

Another modern application which can benefit from the I/O subsystem and processor concept is client-server networking. In that scenario, the computer system containing an I/O subsystem and I/O processor is configured as a network server, such as a World-Wide-Web (Web) server or an intranet server. The network server is designed to respond to client requests with the least latency. For instance, messages requested by a client on a network to which the system is connected are retrieved from and transferred over the primary and secondary buses to a network interface controller (NIC) which then forwards the messages to the requesting client via a computer network.

In most circumstances, the requested messages need to be packetized into data packets before they are forwarded to the NIC and ultimately the client. The packetizing can be performed according to the particular network layer protocol used, for example, the Internet Protocol (IP). Each resulting data packet will include a message, a corresponding header, and a network layer header checksum. The checksum is the sum of a group of bits in the data packet defined by the protocol, and is used for detecting and correcting errors in the data packet as the data packet travels to the client through the network. The checksum that is calculated can be the network layer checksum typically transmitted with every Ethernet data packet, although other combinations of network layer and lower layer protocols can also be used.

Computing the checksum for each data packet presents a significant task for the host or the core processor, because of the large number of bits in a typical Ethernet data packet, and because of the large number of data packets that are typically processed by the network server. Although, just as with the storage application described above, a software solution for computing the checksum (conventionally known as a "checksum algorithm") is flexible, the approach takes longer to complete the task, and therefore becomes less desirable, as data packet sizes increase or as the number of data packets increases.

Figure 5:
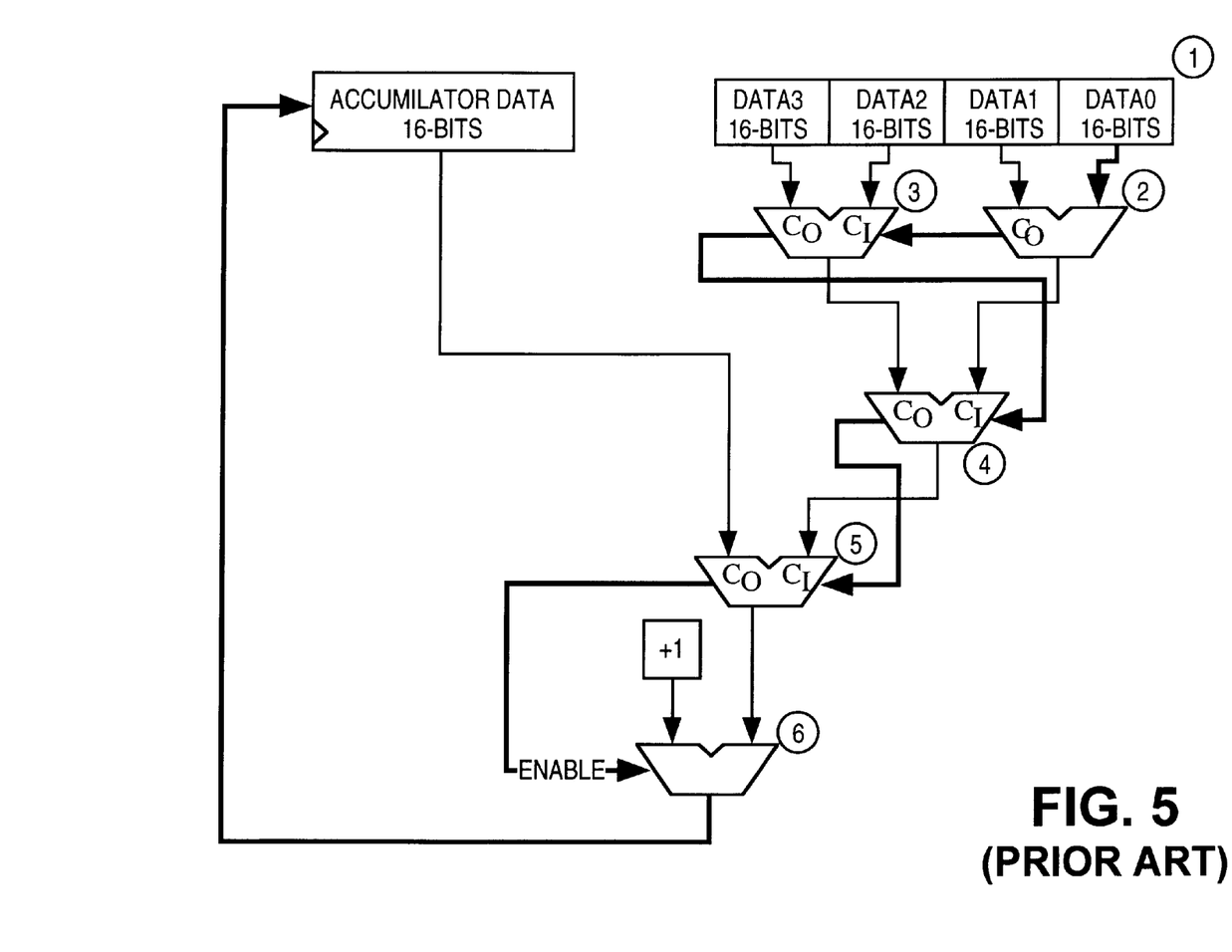
FIG. 5 is a block diagram of conventional adder logic.

The network checksum calculation can be implemented in hardware as a conventional add-accumulate methodology as seen in FIG. 5 and described below with reference to steps numbered 1–6. The checksum calculation is performed on a data block that is broken into a number of smaller data words. For example, a 128-byte block can be broken into 64 data words of 16 bits (2 bytes) each. In step 1, data is read as four data words. In step 2, data 0 and data 1 are added. In step 3, data 2 and data 3 are added to a carry from step 2. In step 4, the result from step 2 is added to the result from step 3 and a carry-out of step 3. In step 5, the result from step 4 is added to a previous accumulative result (initially zero)

and the carry-out of step 4. In step 6, 1 is added to the result of step 5 if step 5 resulted in a carry-out. The result from step 6 is then written into the accumulator.

Steps 1–6 are repeated using the accumulator contents of the previous iteration, until all data in a given data block is read and its sum appears in the accumulator. This method, however, creates a very long critical path (highlighted in FIG. 5). The path begins at the least significant bit of Data0, and ends at the most significant bit of Accumulative Data. Using the following assumptions for estimating levels of gates in a 1-bit ripple carry adder:

| | |
|---|---|
| Data-In--->Data-Out | 3 levels |
| Data-In--->Carry-Out | 3 levels |
| Carry-In--->Data-Out | 1.5 levels |
| Carry-In--->Carry-Out | 2 levles | the critical path for the conventional technique of FIG. 5 becomes:

Step 2: (Data-In→Carry-Out)*1+(Carry-In—Carry-Out)*5

Step 3: (Carry-In→Carry-Out)*16

Step 4: (Carry-In→Carry-Out)*16

Step 5: (Carry-In→Carry-Out)*16

Step 6: (Carry-In→Carry-Out)*15+(Carry-In—Data-Out)*1=160.5 gates

In view of the foregoing, it would be desirable to provide storage and networking application developers with the ability to design and manufacture a specialized computer system for more efficiently performing storage and networking applications to increase throughput in the computer system.

SUMMARY

The invention in one embodiment is directed at a data processor having an internal bus and an application accelerator unit (AAU) being integrated in the data processor and coupled to the internal bus. The AAU has a storage queue for holding data to be transferred to and from a memory coupled to the internal bus, and a boolean unit configured to perform a boolean operation between first data and second data to yield result data. The AAU is configurable to read the first and second data from the memory, perform the boolean operation and write the result data back to the memory.

BRIEF DESCRIPTION OF THE DRAWINGS

The above briefly summarized features of an embodiment of the invention as well as other features and advantages will be apparent from the following detailed description, claims, and figures where:

DETAILED DESCRIPTION

As briefly summarized above, the invention presents a multi-functional hardware application accelerator unit (AAU) that can be integrated into a data processor such as an I/O processor. In a particular embodiment, the AAU is part of an I/O processor (IOP) integrated circuit (IC) die and includes hardware that interfaces with local memory and facilitates the execution of boolean operations used when the IOP is configured as part of a RAID storage application, thereby reducing the need for complex additional hardware outside of the IOP. The AAU may also be configured to simply perform a local memory transfer without performing any boolean operation, whenever a block of data needs to be moved from one region of memory to another.

In addition, the AAU may include hardware that efficiently performs a network checksum calculation by taking advantage of some of the functional blocks and data paths otherwise used by the storage application. By calculating the checksum in hardware rather than having the core processor of the IOP, or the host processor, perform the calculation, the AAU allows the IOP to forward error free data to the host processor faster than the software solution discussed in the background. This makes the IOP even more effective when used as part of a networking application.

The IOP armed with the integrated AAU may perform the storage and networking functions faster than conventional IOP designs, because of the integrated hardware mentioned above, and because of a wider internal bus (see description of FIG. 1 below). Integrating the storage and networking functions into the IOP die also greatly enhances the value of the IOP to a system developer such as a motherboard designer or adapter card architect.

Figure 1:
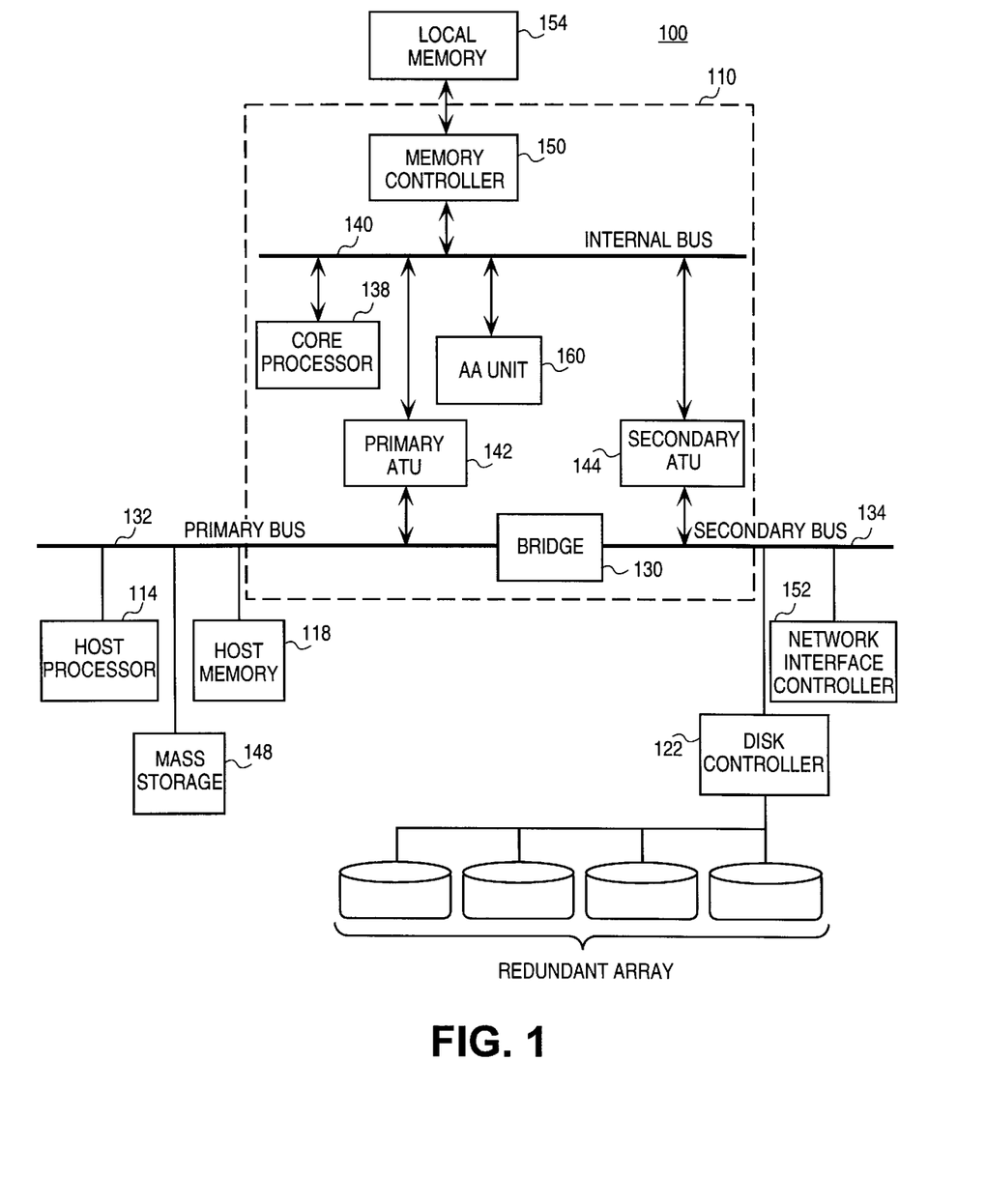
FIG. 1 illustrates an embodiment of the invention as a multiple bus computer system featuring an application accelerator unit.

FIG. 1 illustrates an embodiment of the invention as a computer system 100 having a multiple bus architecture based on the *PCI Local Bus Specification,* Rev. 2.1, Oct. 21, 1994, PCI Special Interest Group, Portland, Oreg. The computer system 100 features a system bus that has two physical portions, a primary PCI bus 132 and a secondary PCI bus 134. The two buses are coupled by a bridge 130. The computer system 100 includes a host processor 114 coupled to a host memory 118 via the primary bus 132, and peripheral devices such as a disk controller 122 and a network interface controller 152 on the secondary PCI bus 134.

A data processor 110 provides for intelligent I/O with the help of a core processor 138 and memory controller unit 150 coupled to an internal bus 140. In one embodiment, the internal bus is kept inside the data processor die, thus permitting the width of bus 140 to be easily increased over one that extends outside the die to obtain better performance from data transfers involving the AAU. The memory controller interfaces a local memory 154 that may include random access memory (RAM) such as Synchronous Dynamic RAM (SDRAM). The local memory 154 contains the instructions and data for execution and use by the core processor. Communication between the PCI system buses and the internal bus 140 is accomplished through primary and secondary address translation units (ATUs) 142 and 144, and one or more direct memory access (DMA) channels (not shown). The architecture permits I/O operations being interrupt intensive tasks involving the peripheral devices on the secondary bus to be routed away from the host processor 114 and handled by the core processor 138.

The data processor 110 also includes an AAU 160 on the internal bus 140. The AAU 160 itself performs independent data transfers, i.e., no interaction with the core processor 138, to and from the local memory 154 in response to commands written to its programming interface by the core processor 138. The AAU 160 reads data from the memory controller 150, performs a boolean operation or checksum on the read data, and transfers the results back to local memory 154 using the internal bus 140 and memory controller 150. In one possible scenario involving a storage application such as RAID, the host processor 114 is configured to notify the data processor 110 (e.g., interrupt the core processor 138) in response to a need for a write of a target block of data to the storage controller 122. The host processor 114 causes the target block to be transferred from the host memory 118 to the local memory 154 prior to being operated on by the AAU 160. The core processor 138 then causes the AAU to perform an XOR operation on the target block in the local memory 154 towards computing parity data. After the AAU has completed its task of computing the parity block and placing it in the local memory, the AAU notifies the core processor 138. The parity block may then be transferred from the local memory to the mass storage controller 122 without the host processor 114 being involved.

Figure 2:
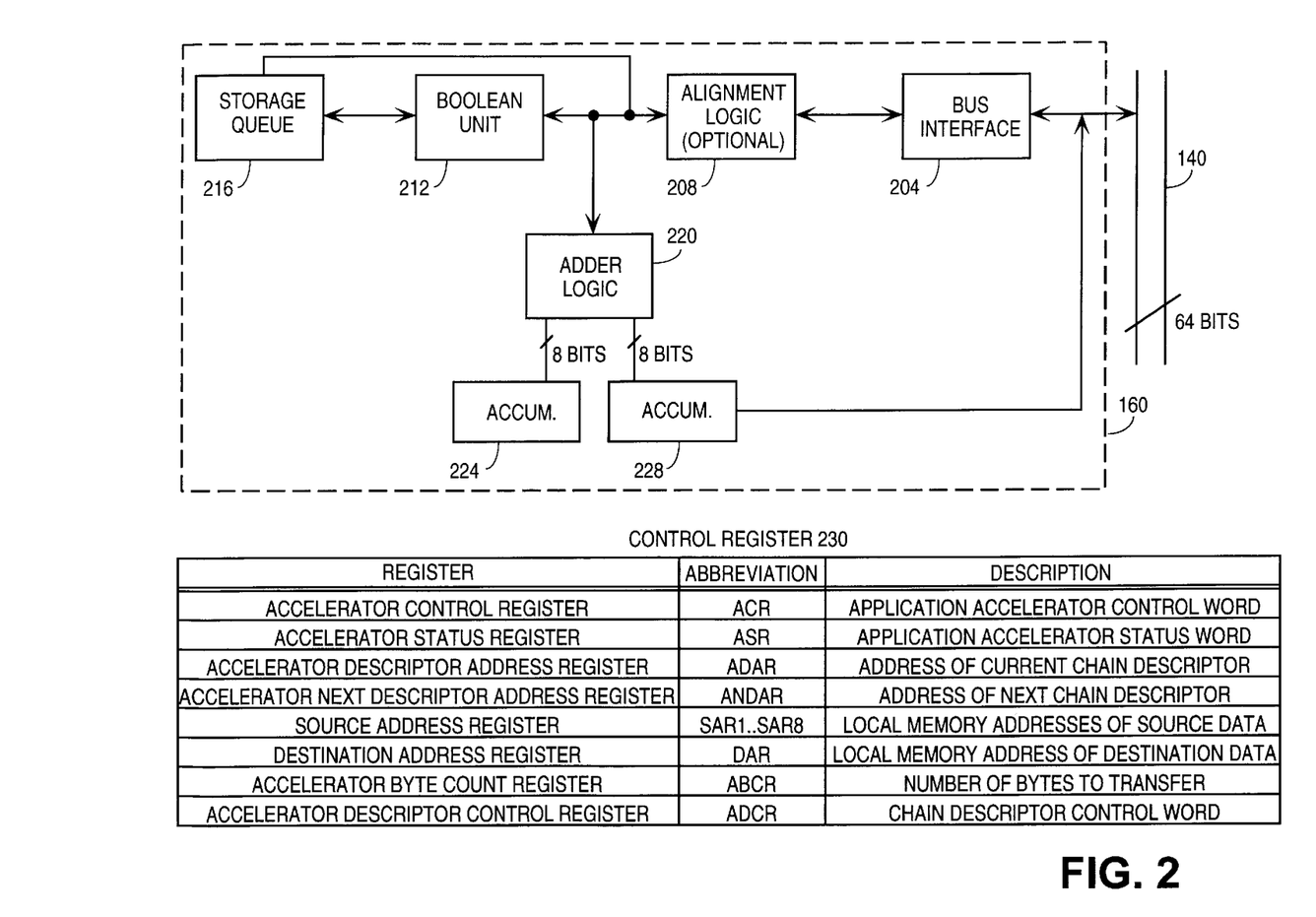
FIG. 2 is a block diagram of the application accelerator unit according to another embodiment of the invention.

FIG. 2 illustrates a more detailed logical block diagram of an embodiment of the AAU 160. The AAU 160 has a programming interface on the internal bus 140 that includes a number of memory-mapped control registers 230. The registers 230 are accessible from the internal bus 140, and are accessed by the core processor 138 executing instructions stored in local memory 154 (see FIG. 1). The particular registers and their functionalities are described in a separate section below.

All data transfers to and from the local memory 154 by the AAU 160 are configured and initiated through the control registers and one or more chain descriptors located in local memory 154. A data transfer is defined by the source address, destination address, number of bytes to transfer, and control values that determine the type of operation to be performed by the AAU 160. This information defining the data transfer is normally loaded into a chain descriptor in the local memory 154 before the transfer begins. The AAU 160 can then be instructed to read the contents of the chain descriptor and accordingly configure its control registers 230.

Once the registers 230 are configured for the transfer, the AAU 160 then reads the source data blocks one at a time from the local memory through the bus interface 204, performs the specified operation, and writes the result blocks to the destination address in local memory 154. To perform more complex operations involving multiple data blocks, descriptors may be linked or chained together, as described, for example, in *i960®RP Microprocessor Users Manual,"* Intel Corporation, February 1996, Chapter 20, DMA Controller.

The AAU 160 contains a boolean unit 212 coupled to the bus interface 204 in FIG. 2. A bi-directional data path exists between the boolean unit 212 and the bus interface 204. Data from the bus interface 204 may bypass or go through the boolean unit 212 unchanged into a storage queue 216, depending on one or more bit values in the control registers 230. The boolean unit 212 may be configured to implement multiple boolean operations in addition to XOR, where the desired boolean operation can be selected according to bit values programmed in the control registers 230. The remaining elements of the AAU 160 including adder logic 220 and accumulators 224 and 228 will be described below in connection with the checksum functions of the AAU 160.

The boolean unit 212 is configured to perform a boolean operation using first data from the storage queue 216 and second data from the bus interface 204 as the operands. Each of the data portions had been transferred from the local memory 154 earlier. The first data had passed unchanged through or around the boolean unit 212 and stored in the storage queue 216. A boolean function can be performed when the second data arrives at the boolean unit 212 from the bus interface 204 in subsequent cycles of the internal bus 140.

The storage queue 216 is a specialized buffer for temporarily storing data while waiting for any one of a number of events to occur, including a boolean or checksum operation performed using the existing data in the queue, new data to overwrite the existing data, and transferring the existing data to the local memory 154. Depending on the configuration of the control registers 230, the existing data in queue 216 may be either written back to the local memory 154 or may be held in the queue 216 for further processing by the AAU 160. The size (width) of the queue 216 and its depth may be selected in view of the amount of data to be transferred from the local memory 154 in each cycle of the internal bus 140. For example, in the embodiment of FIG. 4 which is further described in detail below, the storage queue 216 is arranged as 8 bytes wide (64 bits) by 16 deep.

Figure 3:
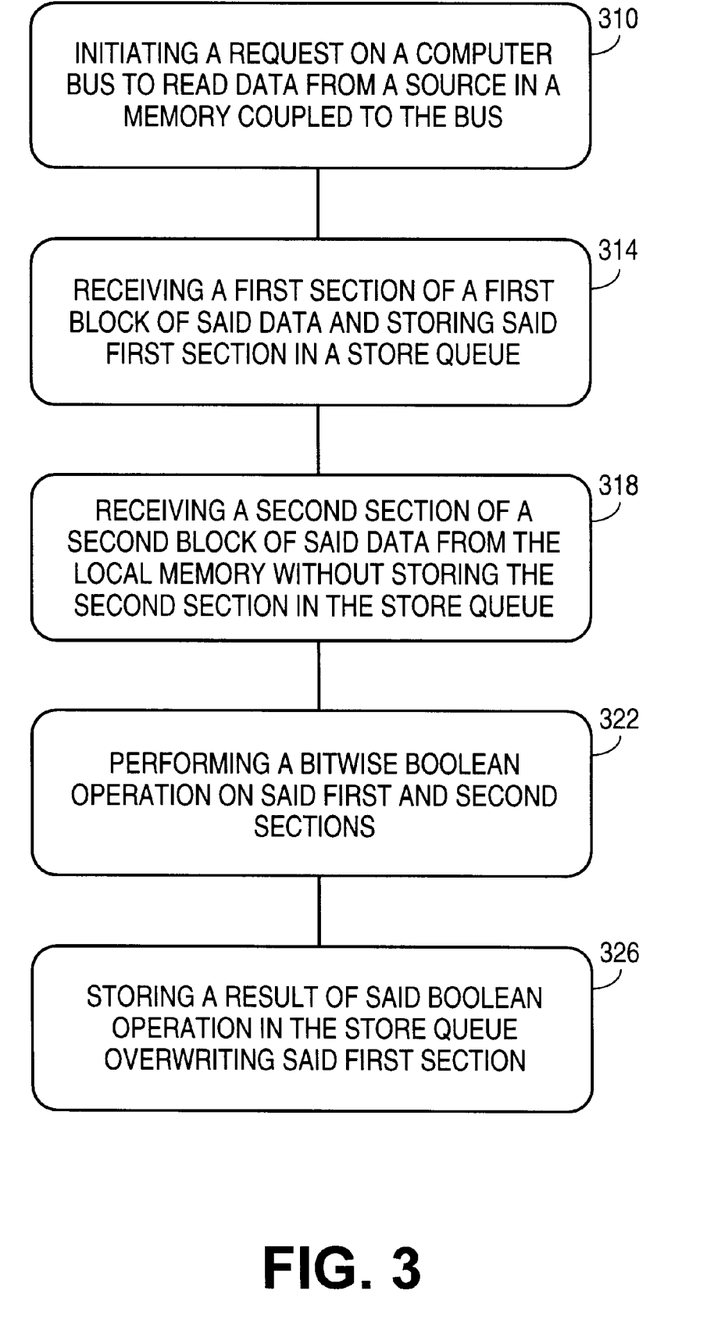
FIG. 3 is a flow diagram of the steps for performing a storage application by an embodiment of the invention.
Figure 4:
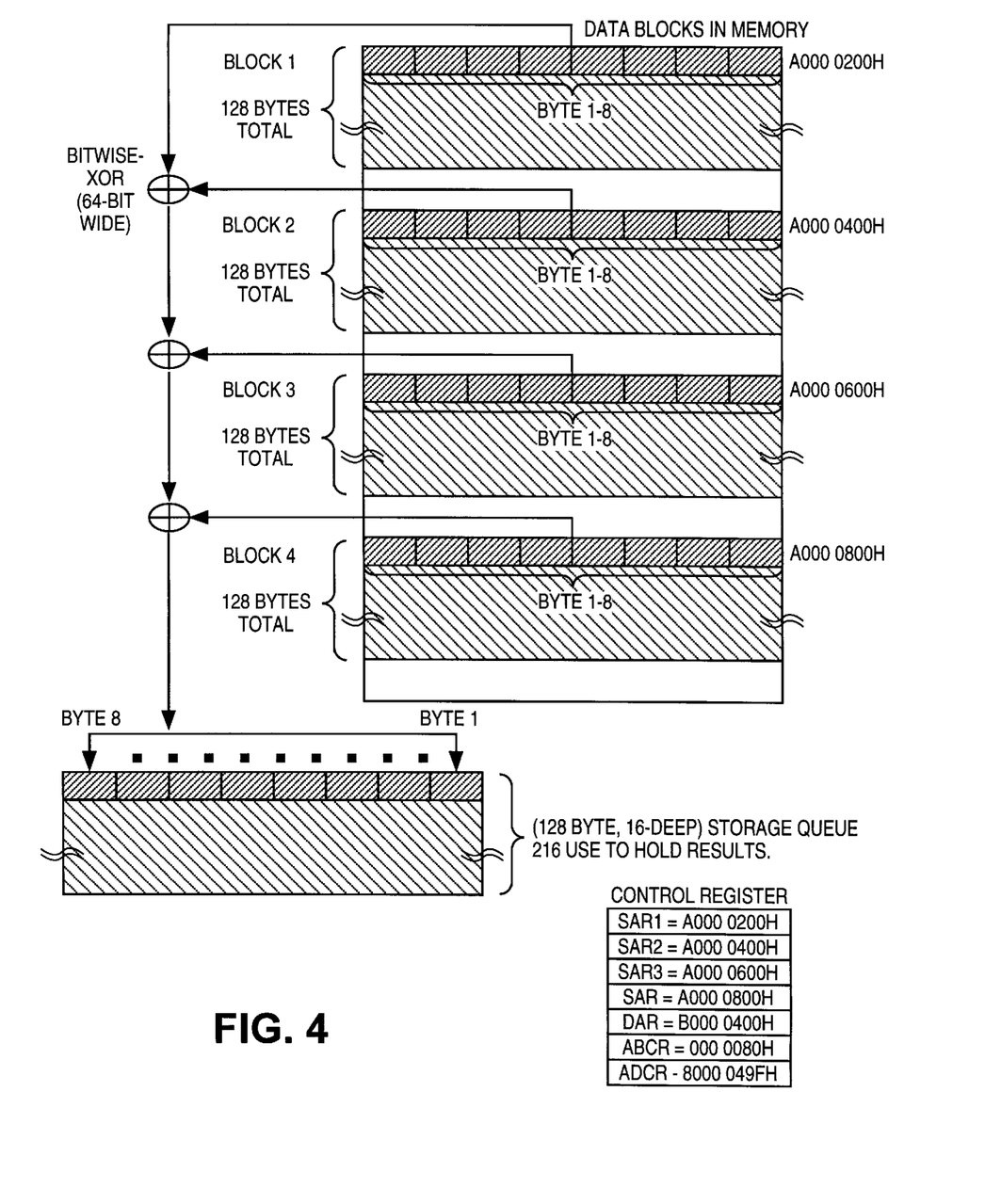
FIG. 4 illustrates the bitwise XOR operation according to an embodiment of the invention.

FIGS. 3 and 4 illustrate the operations performed by the AAU 160 in a data transfer implementing the RAID storage application described above. FIG. 3 shows a number of operation steps that result in the flow of data shown in FIG. 4. FIG. 4 shows four blocks of source data that exist in local memory 154 and that are to be XORed, the result to be stored back into local memory 154. Each block has 128 bytes, the AAU 160 being configured to perform an XOR on 8-byte segments. The figure also shows values in the control registers 230 that indicate the starting addresses SAR1 . . . SAR4 of each block in local memory 154, a byte count value ABCR that specifies the number of bytes in each block (80 H=128 bytes), the destination address DAR of the result block specified in the destination address register, and the address of the current chain descriptor in the local memory 154 (ADCR) that defines this transfer.

The sequence of operations performed in FIGS. 3 and 4 may be collectively described as follows. Operation begins with step 310 where once a chain descriptor has been configured in local memory 154, and its location in local memory has been written into the control registers 230, the AAU 160 acts as a master on the internal bus 140 to read the descriptor and load the control registers 230 with the information defining the data transfer. The AAU then initiates data transfer from the address pointed to by the first source address register (SAR1). The first 8 bytes of data for this block 1 are transferred directly into the storage queue 216 after passing through the bus interface 204 and optional alignment logic 208, as indicated in step 314.

The AAU in step 318 then reads the first 8 bytes of a second block from the location pointed to by the second source address register (SAR2) through the alignment logic and into the boolean unit 212 without storing the data in the store queue 216. In step 322, the boolean unit 212 then performs a 64-bit wide bitwise XOR on the two 8-byte operands as seen in FIG. 4. This first XOR result is then transferred to the storage queue 216 and overwrites the first 8 bytes of previously written data of block 1, as in step 326. The process in steps 310–326 then repeats with the transfer and XOR of the first 8 bytes of data for blocks 3 and 4 from the local memory 154 which fills the first 8-byte section of the storage queue with resulting data as shown in FIG. 4. The above steps are repeated for subsequent 8-byte sections in blocks 1–4 for a total of 16 8-byte sections of result data (or 128 bytes), filling the storage queue 216.

Once all of the resulting data is in the storage queue, the AAU initiates a write to local memory to store the resulting data at the location indicated by the control register DAR.

Networking Application

The above described some of the functional blocks in the AAU that are used in accelerating a storage application. Another aspect of the invention also shown in FIG. 2 is the AAU enhanced with hardware to improve the performance of networking applications, such as network server motherboards. The hardware focuses on efficiently performing an addition such as the network checksum calculation referred to earlier in the Background section.

In one embodiment, the host processor 114 is programmed with a networking task of sending a message to a network via the network interface controller (NIC) 152 (see FIG. 1). The host processor 114 then notifies (e.g., interrupts) the core processor 138 of this need. Thereafter, the host processor 114 is not disturbed regarding the networking task. The core processor 138 causes the message to be transferred to the local memory 154 and then notifies the AAU 160. The AAU, having been programmed with the task of computing a checksum and the location of the message in the local memory 154, performs the checksum and saves the checksum in local memory 154. The AAU 160 then notifies the core processor 138 of this completion. The core processor 138 then causes a data packet having the message and its checksum to be transferred to the NIC 152 and ultimately over the network.

In the reverse scenario, a data packet is received by the NIC 152 from the network. The data packet is then transferred to the local memory 154 in response to the core processor 138 becoming aware of its arrival (e.g., via interrupt from the NIC). The core processor 138 then performs a checksum verification by summing the relevant bits in the data packet and comparing the sum to the checksum value previously encoded in the data packet. If there is a match, then the host processor 114 is notified and the error-free message may then be transferred to the host memory 118. The checksum embodiment of the AAU 160 described above may also use the optional alignment logic 208 in FIG. 2 for unaligned data transfers to and from the local memory 154.

The checksum operation involves the adder logic 220 and separate data accumulator units 224 and 228 in FIG. 2. The adder logic 220 and the data accumulators are used to perform a sum of selected bits in a given data packet, where the data packet has been divided into (8-byte) 64-bit sections for the embodiment in FIG. 2. One embodiment of the invention is the particular adder logic depicted in FIG. 6.

Figure 6:
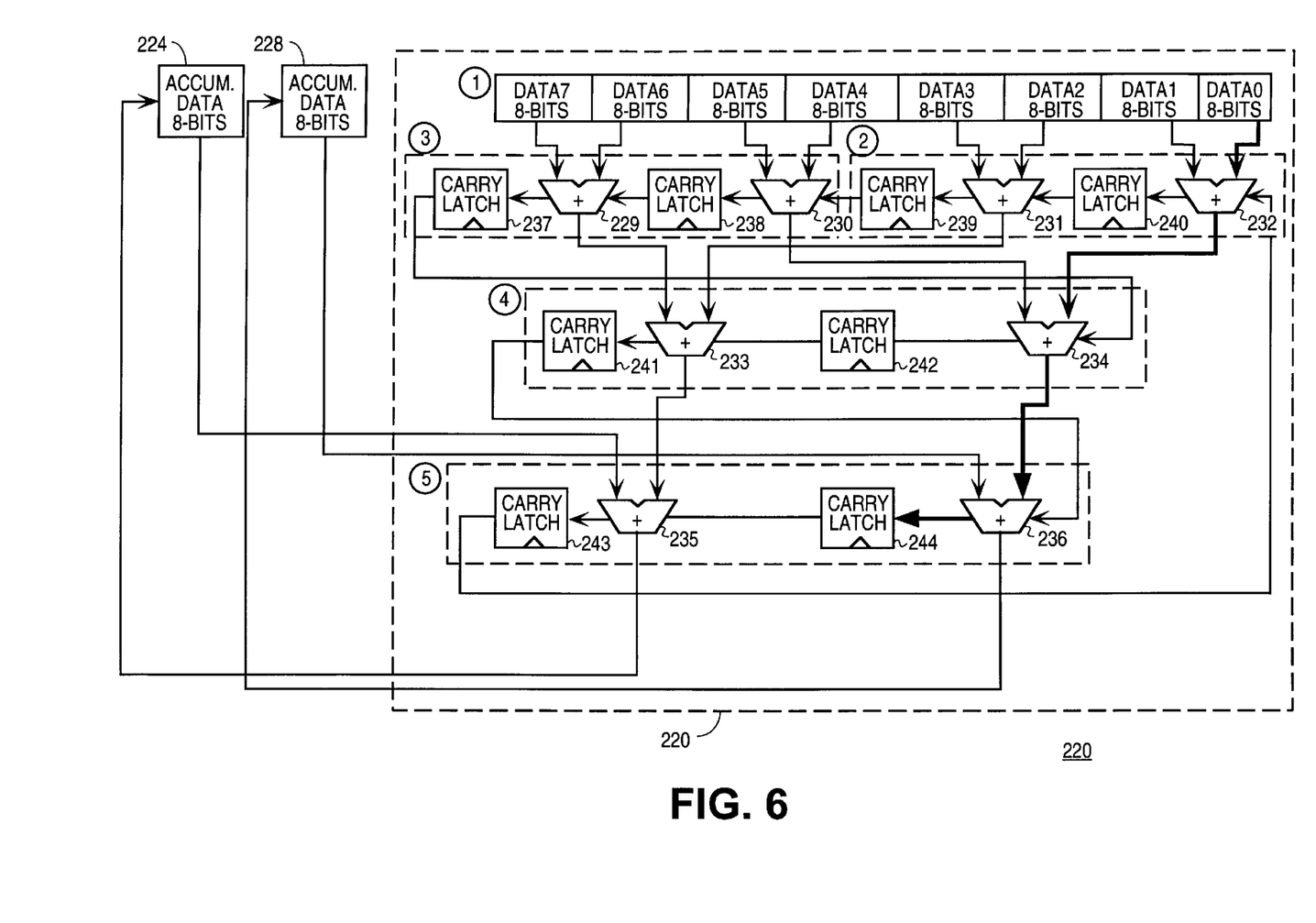
FIG. 6 is a logical block diagram of an embodiment of the invention as adder logic.

To help illustrate some of the advantages of performing the network checksum addition using the adder logic of FIG. 6, the reader is first referred to the description of a conventional technique for obtaining the checksum presented above in the Background section. It is desirable that steps 1–6 of the conventional technique be performed on a number of bits of data (e.g., 64 bits) in each cycle of the internal bus clock (not shown) of the data processor 110 (see FIG. 1).

The checksum calculation performed using the conventional technique of FIG. 5 can be obtained more efficiently using the embodiment of the invention in FIG. 6. There, the adder logic 220 is partitioned into 8 8-bit addition blocks (229–236) and corresponding carry latches 237–244. The adder logic 220 of FIG. 6 does not create a long ripple effect which was seen in the conventional add-accumulate algorithm of FIG. 5. Instead, the adder logic 220 embraces the concept of pipelining the addition functions in various stages. This method exploits the commutative property of arithmetic addition, i.e. addition is order independent, such that the carries need not be added in the same clock cycle of the internal bus 140. Furthermore, step 6 of the conventional technique in FIG. 5 is in effect eliminated by feeding back the carry-out of step 5 to the carry-in of step 2. The critical path (highlighted in FIG. 6) now becomes:

Step 2: (Data-In—Data-Out)*1
Step 4: (Data-In—Data-Out)*1
Step 5: (Data-In—Carry-Out)*1+(Carry-In—Carry-Out)*7=23 gates The addition is still incomplete at the end of step 5, with carry bits (237–244) not yet added into the result. However, the carry bits are added concurrently with the addition performed upon the next 64 bits of data received in the next clock cycle of the internal bus 140. Therefore, instead of adding $DATA_n + CARRY_n$ in $CYCLE_n$ (FIG. 5), the embodiment of the invention in FIG. 6 performs $DATA_n + CARRY_{(n-1)}$ in $CYCLE_n$ where $n$ refers to the internal bus clock cycle. As stated earlier, since addition is commutative, the same sum is achieved using either method, with the benefit of obtaining the sum 6–7 times faster using the embodiment of the invention in FIG. 6 over using the conventional technique in FIG. 5.

Two additional internal bus clock cycles are needed after the last 64-bit section of data to be added has been passed from the bus interface 204 to the adder logic 220 to complete all of the carry-out ripples captured by the carry latches, because in this embodiment the carry is broken at 8-bit boundaries. Alternatively, the carry path may be latched at 16-bit boundaries (1 additional clock cycle), or 4-bit boundaries (4 additional clocks cycles), etc. During these additional clock cycles, data input (Data0–Data7) is driven to 0.

The adder logic 220 may be implemented in a digital complimentary metal oxide semiconductor (CMOS) fabrication process, such that one new 64-bit section of data (Data 0 to Data 7) may be accepted by the adder logic 220 in every cycle of a 66 MHz clock for the internal bus 140.

The embodiments of the AAU 160 in FIG. 2 that were described above can be enhanced with an optional alignment logic 208. The alignment logic enables data transfers from and to unaligned addresses in the local memory 154 (see FIG. 1). Better performance may be obtained from aligned transfers, where the desired data is located at an address that is aligned with or starts at a predefined boundary. For example, the particular embodiment of the invention in FIG. 2 can be used in a system with an 8-byte (64 bits) boundary with the AAU being configured to process 8 bytes in each internal bus clock cycle. If the starting address of a data block (having multiple 8-byte components) requested by the AAU does not lie on an 8-byte boundary, then the alignment logic 208 rotates or shifts the received data block so that the first byte fed to the boolean unit 212, stored in the storage queue 216, or received by the adder logic 220, contains the desired data. If the alignment logic 208 is not used, then the data arriving into the AAU 160 at the bus interface 204 should have been aligned in software, e.g., using instructions executed by the core processor 138.

The alignment logic if implemented should be able to access the control registers 230 to determine the total number of bytes in a data block that are to be transferred to the AAU. Note that each data block may require several bus cycles to arrive from the local memory. For example, a suitable data block size for a 64-bit internal bus may be 128 bytes.

Register Definitions

Having generally described the storage and networking functions performed in various embodiments of the AAU, another more particular embodiment of the invention is now presented in which the AAU 160 contains a number of memory-mapped control registers 230 that control its operation. Some of the control registers 230 may have been referenced above, but are now described in more detail. FIG. 2 illustrates an exemplary group of such registers which are briefly described below.

The accelerator controller register (ACR) specifies parameters that dictate the overall operating environment of the AAU. The ACR should be initialized prior to all other AAU registers following a system reset. The register may be read or written to while the AAU is active. The ACR contains an AA enable bit field which when set enables the AA to transfer data. A chain resume bit can also be provided which causes the AAU to resume chaining by reading the current descriptor located at the address specified in the accelerator descriptor address register (ADAR).

The accelerator status register (ASR) contains status flags. The register may be read by software to examine the source of an interrupt generated by the AA. Interrupts are caused by the normal termination of a transaction or by an error occurring when the transaction is being carried out by the AAU.

The accelerator descriptor address register (ADAR) contains the address of the current chain descriptor in the local memory that is used for a boolean transfer or a network checksum calculation. This is normally a read-only register that is loaded when a new chain descriptor is read by the AAU. The accelerator next descriptor address register (ANDAR) contains the address of the next chain descriptor in the local memory.

The source address registers (SARx) contain a starting local memory address. Each is loaded (when a chain descriptor is read from the local memory) with the starting address of a block of data to be operated upon by the AAU.

The destination address register (DAR) contains a local memory address where the result of the boolean or checksum operation is stored. The value in the DAR is continuously updated by the AAU as the boolean or checksum operation is performed on each section of each block of data. As such, the DAR is normally a read-only register.

The accelerator byte count register (ABCR) is a read-only register that is loaded by the AAU with the byte count word in a chain descriptor. The ABCR contains the number of bytes to transfer for the current chain descriptor. Any time the ABCR is read by the core processor, the value read indicates the number of bytes left to complete the boolean or checksum operation for the particular chain descriptor. The register is decremented by a given number of bytes for every successful transfer from the storage queue to the destination in local memory. A value of zero in the ABCR may be a valid byte count and result in no read or write cycles being generated to the memory controller unit.

The accelerator descriptor control register (ADCR) contains values that control the data transfer on a per chain descriptor basis. The register is normally read-only and is loaded by the AAU when a chain descriptor is read from the local memory. The ADCR may contain a number of fields, including the following:

A Destination Write Enable bit determines whether data present in the storage queue may be written out to the local memory. If set, data in the queue will be flushed to the address specified in the DAR after performing the specified operation in the command control field (see below). When clear, the data will be held in the queue.

The Supplemental Block Control Interpreter is a bit field that specifies the total number of data blocks on which the XOR transfer operation or the network checksum calculation is to be performed. For example, in the embodiment of the invention operating as FIG. 4, there are four data blocks to be operated upon. The Block Control field can be changed to indicate a greater number of blocks if additional source address registers are provided in the AAU 160. This capability allows the AAU 160 to be configured to fetch additional blocks of data for the boolean operation if needed (as determined by the system application) while the AAU 160 is operating on other blocks of data.

The Block x Command Control field specifies the type of operation to be carried out on the particular block of data pointed to by the corresponding SARx register. With respect to the first block of data, a DirectFill command will signify that the data in the first block be transferred directly from the local memory to the storage queue, thus bypassing the boolean unit. At least four additional and different commands are contemplated. A Null command implies that the particular block may be disregarded for the current chain descriptor. In other words, the AAU will not transfer data from this block when processing the current chain descriptor. An XOR command implies that the block will be transferred to the AAU to execute an XOR boolean function. A CS (checksum) command implies that the block 1 data be transferred to the AAU to execute the network checksum calculation.

To summarize, the embodiments of the invention described above are directed at an AAU 160 in a single integrated circuit data processor that may be used as an I/O processor (IOP) in an I/O subsystem. In one embodiment shown in FIG. 2, the AAU 160 includes logic for improving the performance of storage applications. A boolean unit 212 is coupled to a storage queue 216 that contains the first operand for the boolean function, the second operand arriving in a subsequent cycle of the internal bus 140. The boolean unit may be configured to perform XOR on the operands to generate a parity block of data needed by a RAID storage application.

Additionally, the AAU 160 may be enhanced with adder logic 220 used in performing a network layer header checksum calculation needed by networking applications.

The AAU in one embodiment includes a memory-mapped programming interface that allows software executed by the core processor of the IOP using the chain descriptor construct to use the AAU not just for accelerating storage and networking applications, but also for high-speed direct memory access (DMA)-type transfers of data from one area in the local memory to another.

The embodiments of the invention are, of course, subject to other variations in structure and implementation. For example, the embodiments have been described using a 64-bit internal bus, but one of ordinary skill in the art will recognize that the invention may also be applied to narrower or wider buses. Also, some of the control registers 230 of the AAU may have read/write access, while others may be read-only once the values of the registers have been loaded from the chain descriptor. In general, the scope of the invention should be determined not by the embodiments illustrated but by the appended claims and their legal equivalents.

What is claimed is:

1. A data processor, comprising:
   internal bus;
   application accelerator unit (AAU) being integrated in said data processor and coupled to the internal bus, the AAU having storage queue for holding data to be transferred to and from a memory coupled to the internal bus and a boolean unit configured to perform a boolean operation between first data and second data to yield result data, the AAU being configurable to read the first and second data from the memory, perform the boolean operation and write the result data to the memory; and adder logic for performing an addition on third data read from the memory, the adder logic comprising a plurality of adders configured to add first bits of the third data to old carry bits generating new carry bits in a current clock cycle of the internal bus, the old carry bits having been generated by the adders adding second bits of the third data in a prior clock cycle of the internal bus, and a plurality of latches coupled to the adders, each latch for capturing one of the new carry bits and for providing one of the old carry bits.

2. A data processor as in claim 1 wherein the boolean operation comprises an exclusive-or (XOR) operation.

3. A data processor as in 1 further comprising a plurality of memory-mapped address registers used as a programming interface for specifying source addresses of the first and second data, and a destination address of the result data.

4. A data processor as in claim 3 wherein one of the address registers is configured to receive the address of a descriptor, the descriptor specifying the starting addresses of said first and second data.

5. A data processor as in claim 3 wherein the address registers specify the addresses of a plurality of linked descriptors, the data processor being further configured to perform the boolean operation on a plurality of blocks of data specified by the linked descriptors.

6. A data processor as in claim 3 further comprising a core processor coupled to the internal bus, the core processor being configured to access a programming interface of said AAU on the internal bus to write the addresses of the first and second data to the memory-mapped registers.

7. A data processor as in claim 1 further comprising:

memory controller coupled to the internal bus and configured to transfer said first and second data from the memory to the AAU.

8. A computer system, comprising:

memory;

data processor having an internal bus, the memory being coupled to the internal bus;

primary and secondary buses, coupled to the data processor;

application accelerator unit (AAU) being integrated in said data processor and coupled to the internal bus, the AAU having a boolean unit configured to perform a boolean operation between first data and second data to yield result data, the AAU being configurable to read the first and second data from the memory, perform the boolean operation and write the result data to the memory;

host processor and host memory coupled to the primary bus; and mass storage controller coupled to the secondary bus, the host processor being configured to notify the data processor in response to executing instructions stored in host memory and cause the first and second data to be transferred from the host memory to the memory prior to being operated on by the AAU, the system being configured to transfer the result data from the memory to the mass storage controller.

9. The system of claim 8 further comprising:

adder logic for performing an addition on third data read from the local memory.

10. The computer system of claim 9 further comprising:

network interface controller coupled to the secondary bus, the host processor being configured to notify the data processor in response to executing instructions stored in host memory and cause the third data to be transferred from the host memory to the local memory prior to being operated on by the AAU, the system being configured to transfer a data packet including the third data and a result of the addition to the network interface controller.

11. A data processor comprising:

internal bus; and application accelerator unit (AAU) being integrated in said data processor and coupled to the internal bus, the AAU having adder logic for performing an addition on data read via the internal bus, the adder logic including a plurality of adders configured to add first bits of the third data to old carry bits generating new carry bits in a current clock cycle of the internal bus, the old carry bits having been generated by the adders adding second bits of the third data in a prior clock cycle of the internal bus, and a plurality of latches coupled to the adders, each latch for capturing one of the new carry bits and for providing one of the old carry bits.

12. A data processor as in claim 11 further comprising a plurality of memory-mapped address registers used as a programming interface for specifying source addresses of the first and second data, and a destination address of the result data.

13. A computer system comprising:

memory;

data processor having an internal bus, the memory being coupled to the internal bus, and AAU being integrated in said data processor and coupled to the internal bus, the AAU having adder logic for performing an addition on data read via the internal bus, the adder logic including a plurality of adders configured to add first bits of the third data to old carry bits generating new carry bits in a current clock cycle of the internal bus, the old carry bits having been generated by the adders adding second bits of the third data in a prior clock cycle of the internal bus, and a plurality of latches coupled to the adders, each latch for capturing one of the new carry bits and for providing one of the old carry bits.

14. The computer system of claim 13 wherein the data processor further comprises a plurality of memory-mapped address registers used as a programming interface for specifying source addresses of the first and second data, and a destination address of the result data.

15. The computer system of claim 13 further comprising:

primary and secondary buses, coupled to the data processor;

host processor and host memory coupled to the primary bus; and network interface controller coupled to the secondary bus, the host processor being configured to notify the data processor in response to executing instructions stored in host memory and cause the third data to be transferred from the host memory to the local memory prior to being operated on by the AAU, the system being configured to transfer a data packet including the third data and a result of the addition to the network interface controller.

16. An electronic system comprising:

memory;

data processor having a bus, said memory being coupled to the bus; and application accelerator unit ("AAU") being integrated in the data processor and coupled to the bus, the AAU having a boolean unit configured to perform a boolean operation between first data and second data to yield result data, the AAU being configurable to read the first and second data from said memory and then perform the boolean operation and write the result data to said memory;

adder logic for performing an addition on third data read from said memory;

primary and secondary busses coupled to the data processor;

host processor and host memory coupled to the primary bus; and network interface coupled to the secondary bus, the host processor being configured to notify the data processor in response to executing instructions stored in the host memory and cause the third data to be transferred from the host memory to said memory prior to being operated on by the AAU, the system being configured to transfer a data packet including the third data and a result of the addition to the network interface.

* * * * *